United States Patent [19]

Nofal

[11] 4,201,755

[45] May 6, 1980

[54] SULPHUR OXIDE REMOVAL FROM GAS

[75] Inventor: Abb A. Nofal, Tulsa, Okla.

[73] Assignee: Combustion Engineering, Inc., Windsor, Conn.

[21] Appl. No.: 949,707

[22] Filed: Oct. 10, 1978

Related U.S. Application Data

[63] Continuation-in-part of Ser. No. 761,092, Jan. 21, 1977, abandoned.

[51] Int. Cl.² .............................................. C01B 17/00
[52] U.S. Cl. .................................................... 423/242
[58] Field of Search .......... 423/242 A, 242 R, 244 A, 423/244 R, 512

[56] References Cited

U.S. PATENT DOCUMENTS

| | | | |
|---|---|---|---|
| 1,271,899 | 7/1918 | Howard et al. | 423/242 A |
| 2,113,198 | 4/1938 | Nonhebel et al. | 423/242 A |
| 3,790,660 | 2/1974 | Earl et al. | 423/242 A |
| 3,808,321 | 4/1974 | Fukui et al. | 423/242 A |
| 3,980,756 | 9/1976 | Dixson et al. | 423/242 A |

*Primary Examiner*—O. R. Vertiz
*Assistant Examiner*—Gregory A. Heller
*Attorney, Agent, or Firm*—Arthur L. Wade

[57] ABSTRACT

Two zones are connected to each other and to a source of gas containing sulfur oxide as a pollutant to be removed. The gas is passed through the two zones in series and scrubbed with aqueous solutions. The pH level is controlled in each zone to minimize the amount of chemical added to the solutions and maximize the efficiency of the sulfur oxide removal.

3 Claims, 1 Drawing Figure

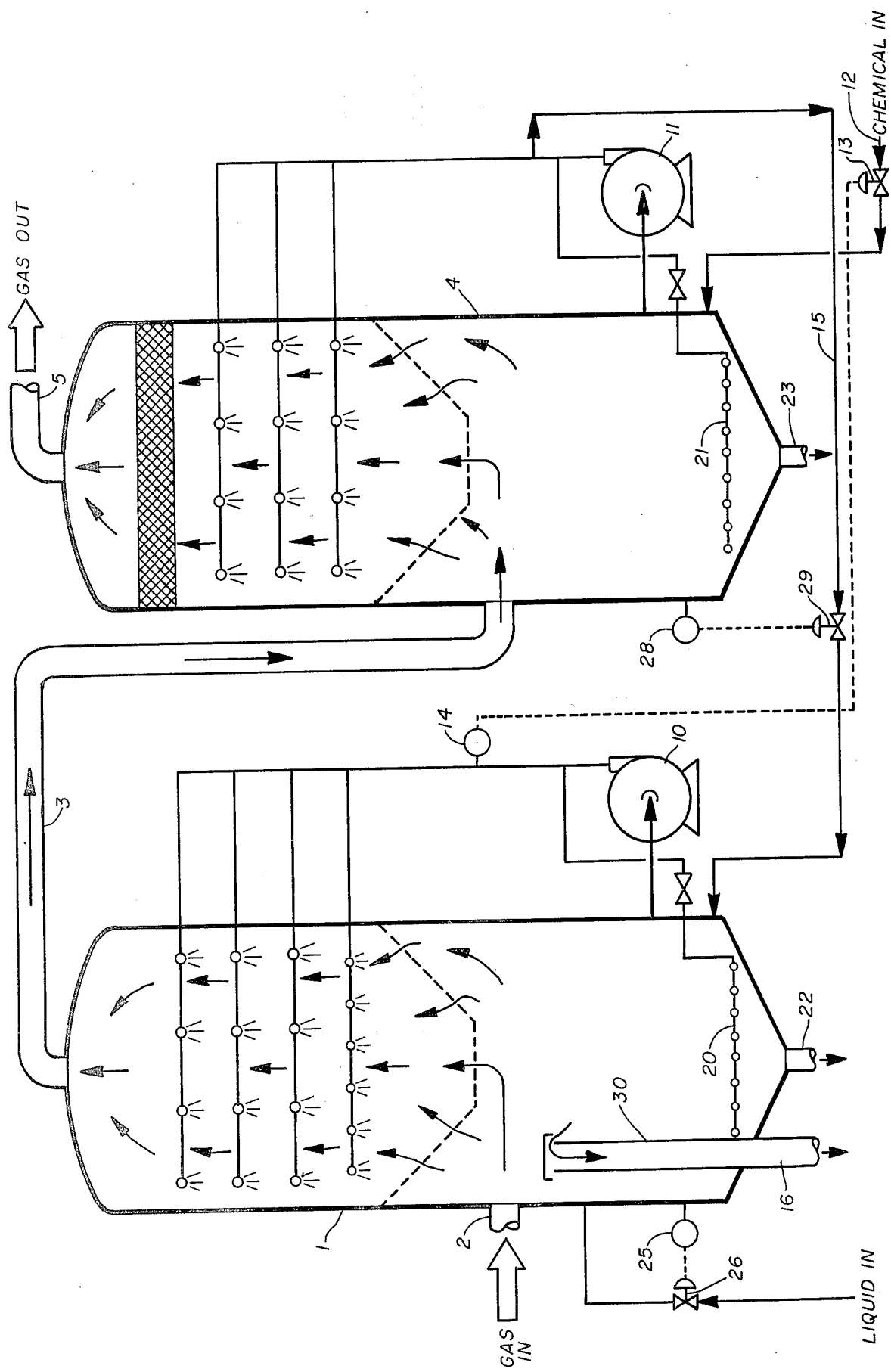

SULPHUR OXIDE REMOVAL FROM GAS

This application is a continuation-in-part of application Ser. No. 761,092 filed Jan. 21, 1977 now abandoned.

BACKGROUND OF THE INVENTION

1. Field of the Invention

The present invention relates to the use of an aqueous solution in scrubbing sulfur oxide from the gases exhausted from a combustion process. More particularly, the invention relates to the use of an aqueous solution of high reserve alkalinity in plural zones, each of the zones controlled to different pH values, to react with sulfur dioxide ($SO_2$) and remove it from combustion gases.

2. Description of the Prior Art

A long-standing problem is the air pollution by sulfur oxides in gases discharged from the combustion of sulfur-containing fuels. There are removal systems which use an aqueous solution having materials which will react with the sulfur oxides upon contact.

The most commonly used contact materials may be limestone and dolomite. These materials have been added to the furnace in which combustion takes place. An aqueous slurry has also been formed of these materials to contact and remove, or scrub, $SO_2$ from the combustion gases. However, there are several handling problems with these materials because they are insoluble. Additionally, the chemistry of their system is hard to control in order to avoid precipitates. And precipitates of this material can physically obstruct the vessels and piping to result in shutdowns. Additionally, the physical access of limestone and dolomite may be a factor in their use.

Evidently a soluble chemical will make it easier to control the pH of the reactions with $SO_2$. Further, the pH of the reactions may be more readily maintained at different values in separate zones to maximize the efficiency of the final reaction while minimizing the quantity of the chemical used to react with the $SO_2$.

SUMMARY OF THE INVENTION

A principal object of the invention is to contact $SO_2$ with a soluble base in a first zone of low pH and then a second zone of high pH.

Another object is to control the pH of both zones with a supply of base to the second zone.

The present invention contemplates a method of removing $SO_2$ from gas by a first contact with an aqueous basic solution, or a solution of high reserve alkalinity, at a pH which will maintain a large ratio of bisulfite to sulfurous acid ($H_2SO_3$), and a second contact with the aqueous basic solution at a pH which will maintain a large ratio of sulfite to bisulfite.

The invention further contemplates the method in which a basic alkali metal compound is supplied to form the aqueous solution and control the addition of the compound to the second zone as a factor in regulation of the pH ranges of both zones.

The invention further contemplates the method in which a basic sodium compound is supplied to form the aqueous solution and control the addition of the compound to the second zone as a factor in regulation of the pH ranges of both zones.

The invention further contemplates the method in which sodium carbonate is supplied to form the aqueous solution and control the addition of sodium carbonate to the second zone as a factor in regulation of the pH ranges of both zones.

Other objects, advantages and features of this invention will become apparent to one skilled in the art upon consideration of the written specification, appended claims, and attached drawings.

DRAWING DESCRIPTION

The drawing is a flow diagram of the gases and fluid solutions reacting in accordance with the invention.

PREFERRED EMBODIMENT

The present invention is embodied in a method of, and structure for, bringing together the sulfur oxides of combustion gases and chemicals to bind the sulfur in compounds which can be disposed of in a way acceptable to current environmental protection practices. $SO_2$ is the oxide which is specifically removed from other gases. The chemical is soluble sodium carbonate. The final product of the process is predominately sodium bisulfite. Of course, the first concern is with the discharge gas. It is stripped, or scrubbed, of $SO_2$ by the chemical process.

It is to be emphasized that sodium carbonate is the chemical preferred because of low cost and ease of handling. The availability of this sodium compound may change. The end user may be willing to accept the handling problems of other basic alkali metal compounds. Therefore, it is possible that another basic sodium compound, such as sodium hydroxide, may be preferred in the future for use in the method in which the present invention is embodied.

GENERAL STRUCTURE

The drawing discloses the structure in which the process is carried out. Tower 1 receives, through inlet 2, the gas polluted with $SO_2$. The first zone, defined by tower 1, is where the chemical and gas make initial contact.

The gases are flowed from the first zone with that portion of $SO_2$ which was not removed in the first zone and routed by conduit 3 to tower 4. The second zone of contact is defined as within this tower 4. Discharge of the treated, scrubbed, stripped, conditioned gases is through outlet 5 from the top of tower 4.

Both towers have a set of nozzles which spray a solution of soluble sodium carbonate into the gases in this preferred embodiment of the invention. The nozzles are supplied the solution by pumps 10, 11. Each pump withdraws solution from the bottom of its tower and recycles it to the nozzles mounted in the upper portion of the tower.

The aqueous solution is supplied the system through conduit 12. The quantity of the solution is regulated by a valve 13 under the control of a meter 14 which detects the pH of the solution to the nozzles of tower 1. The solution of tower 4 is withdrawn through conduit 15 and conducted to the tower 1. The spent, or used, solution of tower 1 is finally discharged from the system through conduit 16.

Although the preferred embodiment of the invention, illustrated in the drawing, specifically discloses meter 14 in the position to sense the pH of the solution circulated by pump 10, it is to be clearly understood that the invention does not limit the control of the input chemical through valve 13 by this pH sensor at this point in the system. The pH in some other portion of the system, that of tower 4 as an example, could be sensed by meter 14 and its control exerted over valve 13. This invention is not to be limited by location of the pH measurements. The measurement is to be made at that point in the system where there is a change in this factor which will effectively dictate the quantitative requirements of the chemical through conduit 12.

The two towers do not function as "stages" in the sense that a series of trays function in a fractionation column. The chemical reaction in tower 1 is distinct from the chemical reaction in tower 4. One example of difference is that the pH values in tower 1 are entirely different from the pH values in tower 4.

There is a progressive removal of $SO_2$. The first portion of $SO_2$ is removed in tower 1 and a second portion is removed in tower 4. But the treating solutions established in each tower are chemically different. The solution bled from tower 4 has $SO_2$ removal potential and must be regarded as having this potential on an entirely different basis than the solution fed to tower 4. The difference is to be explained in several ways in subsequent disclosure.

NOZZLES

The systems of spray nozzles in the upper portion of towers 1 and 4 are not disclosed here in particular form. The development of contact between the solution supplied by pumps 10 and 11 is a specific art. This disclosure will not explore the specific arrangements satisfactory for this service.

The nozzles of this disclosure are arranged in tiers, mounted to spray their solution downward into the rising stream of gases to be contacted by the solution. Whether this arrangement is specifically satisfactory is not subject matter of this disclosure. The pressure drop generated in the flow stream of the treated gases may determine the particular form of structure bringing the solution into contact with the gas stream. In this disclosure it is adequate to generally provide for that contact necessary to remove $SO_2$ from the gas stream conducted into tower 1 through inlet 2. Pumps 10 and 11 cycle the solution from the bottom of towers 1 and 4 to nozzle structure which generates the vapor-liquid contact.

TOWER BLOW DOWN

Each of the towers 1 and 4 are disclosed with cone bottoms. All systems of this general type have the problem of solids collecting on the walls and bottoms of the vessels and conduits. Periodically, towers 1 and 4 must be flushed with fluid to remove solids collecting on their walls and their bottoms.

In tower 1 a spray system is indicated at 20, connected to the discharge of pump 10. In tower 4, a spray system 21 is connected to the discharge of pump 11. The particular form or operation of these spray systems is not an essential element of the present invention. The disclosure simply offers the structure as a means for flushing the towers out discharge conduits 22 and 23. These systems are important, and their particular form and operation may well be developed with unique and inventive features. However, the present disclosure merely indicates the spray systems are important to the operation of this preferred embodiment.

TOTAL DISSOLVED SOLIDS (TDS)

The solutions pumped from the bottom of the towers 1 and 4 must be limited in their proportion of solids to fluid. A system to sense the TDS in the bottom of tower 1 is indicated at 25. System 25 is expected to develop a control signal for valve 26 which regulates a fluid introduced by conduit 27 into the solution in the lower portion of tower 1 to control, or regulate, the TDS of the pumped solution.

Again, this system of TDS control is not an essential element of the invention. Still, it is important and might obscure the teachings of the invention if not disclosed in perspective.

TOWER LEVEL CONTROL

Level control system 28 is expected to respond to the actual level of liquid solution in the bottom of tower 4. Valve 29 is in conduit 15 to regulate the discharge of solution from the lower portion of tower 4. The addition of chemical to tower 4 is by means of conduit 12 under control of pH cell 14. The level control system 28 is expected to follow the regulated addition by a parallel bleed-off through conduit 15.

The level control structure of tower 1 is more simple. Vertical overflow pipe 30 has its upper intake opening at the elevation desired for the solution level in the lower part of tower 1.

GENERAL CHEMICAL CONDITIONS AND TERMINOLOGY

The chemical reactions of the process should be as readily understood as a textbook. However, the description is complicated by the gas, with $SO_2$, flowing in one direction through the zones of the towers and the scrubbing solution flowing through the towers in the opposite direction. The sequence of chemical changes relative to the treated gas is opposite to the sequence of chemical changes relative to the solution.

Before disclosing the method of the invention carried out in the stages, vessels or zones, the reaction of $SO_2$ with water is reviewed. $SO_2$ readily combines with water to form sulfurous acid. This reaction is weak and reversible but it must be understood as providing both bisulfite ions and sulfite ions. The pH relation to the shifting proportions of sulfite and bisulfite ions is well understood.

The graph illustrating the mol fraction of ions in solution as a function of pH for aqueous solutions containing $SO_2$ and related species is found in at least U.S. Pat. No. 3,980,756 issued Sept. 14, 1976, to D. L. Dixson et al. For at least this reason, this patent disclosure is incorporated into this application by reference.

The first and second zones within towers 1 and 4 had their conditions realistically regulated in the recently tested actual reduction to practice. It was originally calculated that the conditions maintained in the zones, including their differential in pH, would follow the conditions graphed in U.S. Pat. No. 3,980,756. In testing the actual reduction to practice, the pH levels of the two zones followed the values graphed in this patent. However, interaction between the connected zones slightly biased the theoretical expectations.

The ratio of sulfite to bisulfite ions in the second stage was high as expected. However, the pH sank to as low as 6 at times. The differential between the second zone and the first zone became as small as 1 pH. Nevertheless, the solution with a high ratio of sulfite to bisulfite discharged from the second stage was efficiently utilized to maintain the high ratio of bisulfite to sulfurous acid in the first stage. The discharge from the first stage, with a high bisulfite content, evidenced effective utilization of the chemical by the process.

The original design of the process contemplated the first stage maintaining a pH near 5.5. The actual reduction to practice maintained the pH at about this level of 5.5 with the SO$_2$ content of the gases into tower 1 measured at about 600 ppm. Thus, the expected performance of the process, in its actual reduction to practice, was by and large quite close to design expectations with the exception of the pH level in the second zone ranging down to as low as 6 and to as high as about 9 to maintain the desired high ratio of sulfite to bisulfite discharge to the first stage.

The terms "first tower" and "second tower" are developed by considering the flow of the gas being treated. Whether the towers are described as containing zones or stages, the initial one of the two to receive the gases is called "the first". Obviously, the next in line is called "the second". This arrangement will sustain the orderly development of the disclosure.

SOLUTION FLOW—SECOND STAGE

Begin with the fact that the chemical is a basic solution to the second stage. The high reserve alkaline feed to the second stage results in a high pH in that stage.

Also, in the second stage, the SO$_2$ not scrubbed in the first stage will hopefully be fairly low. Low is a relative term, of course, but this second stage is operated to be an efficient, final removal, of the SO$_2$. SO$_2$ not removed in the first stage is reduced to the low value desired in the second stage.

In further analysis of the second stage, the SO$_2$ will form sulfurous acid, and in the high pH will fully ionize. The proportion of sulfite to bisulfite will be high due to the high pH.

At the same time, the sodium carbonate (NA$_2$CO$_3$) of the preferred embodiment, added to the second stage as the base, is ionized. The reaction in this second stage will form sodium sulfite and carbon dioxide.

At this point of final contact between the SO$_2$ and sodium carbonate in solution the sulfurous acid is formed and then the sodium sulfite (Na$_2$SO$_3$) and carbon dioxide to irreversibly remove SO$_2$ from the gases. The solution remaining, rich in sulfite ions (SO$_3$-), is conducted forward to the first stage.

SOLUTION FLOW—FIRST STAGE

In the first stage, SO$_2$ of the gases being scrubbed is also forming sulfurous acid. This acid is ionized to bisulfite at the low pH and this bisulfite is combining with the sodium ions of the feed solution from the second stage to form sodium bisulfite. The sodium bisulfite is discharged from the first stage for final disposal.

The sensed pH condition of the process is placed in control of the fresh chemical feed to the second stage. As the sensed pH changes, the base solution feed rate is regulated to the second stage to increase the generation of the sulfite ion to the first stage.

SECOND STAGE CHEMISTRY

As the chemical is added to the second stage, and the output of the resulting chemical solution is flowed to the first stage, the chemistry analysis logically begins with the reactions of the second stage. First, and this is also true in the first stage, the SO$_2$ of the gases reacts with the H$_2$O of the aqueous phase of the feed to form sulfurous acid (H$_2$SO$_3$). The literature of the art emphasizes this as an unstable, reversible reaction, the acid ionizing in dependence upon the pH of the solution. As the second stage is maintained strongly basic by the addition of the fresh feed, [the sulfite ion]/[bisulfite ion] ratio will be high. The equation can be written:

$$H_2SO_3(\text{solution}) \rightleftharpoons 2[H^+][SO_3\text{-}]$$

Turn now to the sodium carbonate. This base is to be examined in its ionized form.

$$Na_2CO_3 \rightleftharpoons 2Na^+][CO_3\text{-}]$$

These two chemicals react and the formula is written:

$$Na_2CO_3 + H_2SO_3 \rightarrow Na_aSO_3 + H_2O + CO_2$$

The carbon dioxide leaves as a gas and the reaction is irreversible. The remaining sodium sulfite is examined in the ionized form:

$$Na_2SO_3 \rightleftharpoons [Na^+][SO_3\text{-}]$$

FIRST STAGE CHEMISTRY

Thus is formed the solution fed to the first stage. Of course, in the first stage, SO$_2$ of the gases being scrubbed is forming sulfurous acid with the aqueous phase, just as in the second stage. The vapor pressure of the SO$_2$ is expected to be greater because the concentration of SO$_2$ is greater, being the initial contact between the SO$_2$ polluted gases and the scrubbing solution.

As the sulfurous acid concentration becomes greater in the first zone, the pH decreases. The driving force to form additional sulfurous acid decreases. A continual supply of sulfite will have to be available to react with sulfurous acid being formed to lower the sulfurous acid formation and raise the pH.

To be more specific, the relation between the mol fractions and pH in the first stage solution will have to be held within the range of 3 to 6. This is evident from the chart of the values in at least U.S. Pat. No. 3,980,756.

The formulation of the chemical reaction is elementary. From the second stage, sodium sulfite is fed to the first stage. Sulfur dioxide in the processed gases is fed to the first stage to form sulfurous acid with the water of the solution. The reaction produces sodium bisulfite as the product of the process. The reaction can be given the form:

$$H_2SO_3 + Na_2SO_3 \rightarrow 2NaHSO_3$$

or $$2[H^+][SO_3\text{- -}] \; 2[Na^+][SO_3\text{-}] \rightarrow 2NaHSO_3$$

The overall teaching is that operation of the second stage at a pH within the range of 6 to 9 will remove SO$_2$ by the continual formation of sodium sulfite. A solution of sodium sulfite in this process has potential for additional removal of SO$_2$ within a range of 3 to 6. Therefore, the present inventive concept is to utilize the SO$_2$ removal potential of sulfite in a separate environment from the environment in which the sulfite was formed. This additional, or full utilization of the chemical will result in a much lower chemical cost than if the removal process were terminated with the production of sulfite from the second stage.

From the foregoing, it will be seen that this invention is one well adapted to attain all the ends and objects hereinabove set forth, together with other advantages which are obvious and inherent to the method and apparatus.

It will be understood that certain features and subcombinations are of utility and may be employed without reference to other features and subcombinations. This is contemplated by and is within the scope of the invention.

As many possible embodiments may be made of the invention without departing from the scope thereof, it is to be understood that all matter herein set forth or shown in the accompanying drawings is to be interpreted in an illustrative and not in a limiting sense.

The invention having been described, what is claimed is:

1. A method of removing $SO_2$ from other gases comprising the steps of:

contacting the $SO_2$ and other gases with a basic alkali metal aqueous solution in a first zone at a pH not greater than 6, which maintains a high ratio of bisulfite to sulfurous acid to increase the bisulfite concentration, continually discharging solution from the first zone with a high concentration of bisulfite ions, contacting the gases and remaining $SO_2$ from the first zone in a second zone with a basic alkali metal aqueous solution in which there is a high ratio of sulfite to bisulfite maintained by a relatively high pH not less than 6 wherein $SO_2$ from the first zone now forms ionized sulfurous acid to maintain a high ratio of sulfite ions to bisulfite ions, Flowing the solution formed in the second zone as the contact solution in the first zone, and discharging the gases from the second zone with the $SO_2$ reduced to a desired level.

2. The method of claim 1 wherein, the basic alkali metal solution is formed with sodium carbonate.

3. The method of claim 1 including, sensing a pH value of a solution within the process which varies with the quantity of $SO_2$ in the gas mixture, and controlling the rate of alkali metal compound supplied to form the basic alkali metal aqueous solution in accordance with the pH sensed.

* * * * *